United States Patent Office 2,797,915
Patented July 2, 1957

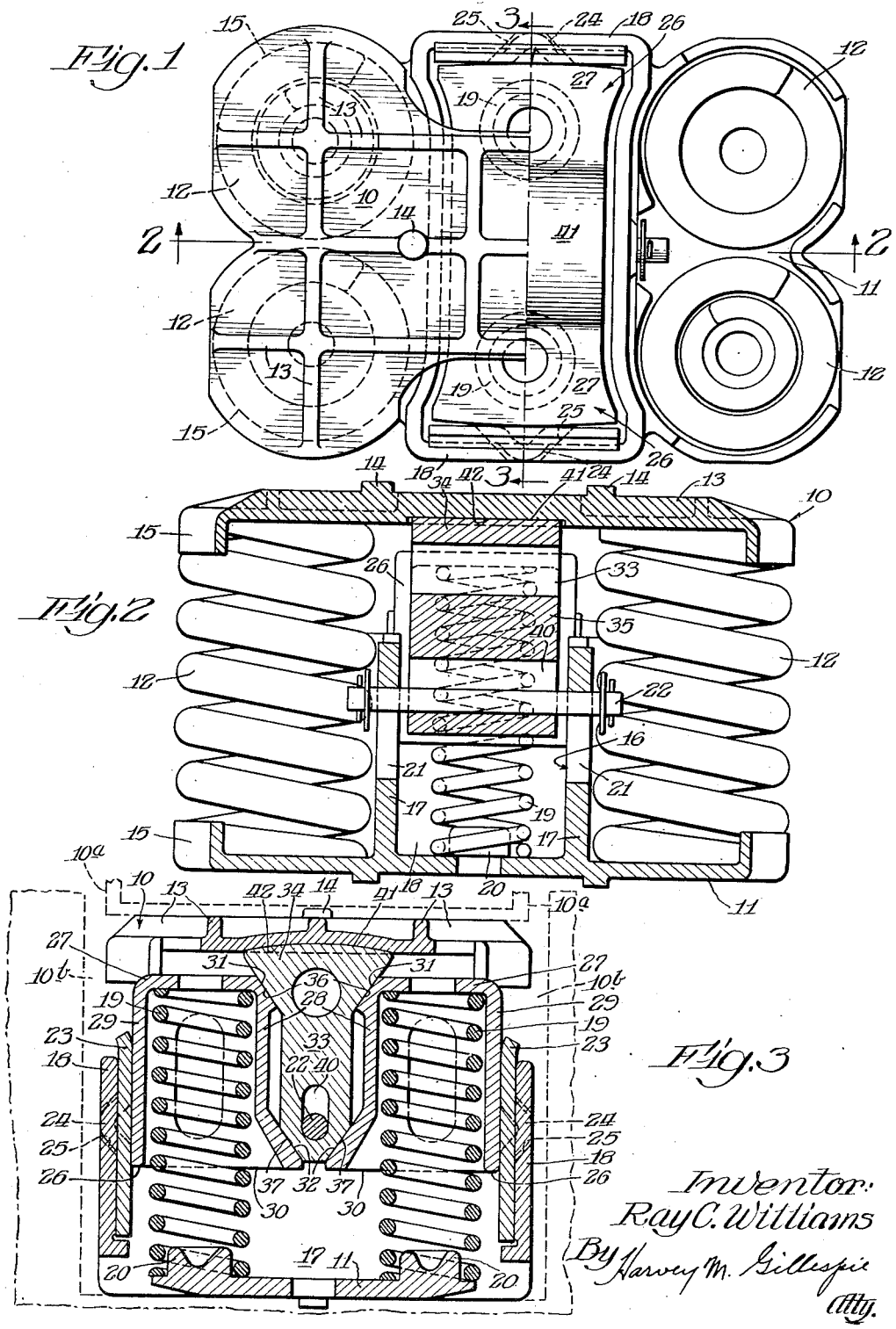

2,797,915

STABILIZED SPRING GROUP ASSEMBLY

Ray C. Williams, Chicago, Ill., assignor to Standard Car Truck Company, Chicago, Ill., a corporation of New Jersey Application January 27, 1955, Serial No. 484,491

5 Claims. (Cl. 267—9)

The present invention relates to an improved form of stabilized spring group assembly adapted to be installed in each bolster window of a railway car truck to support the truck bolster and to transmit the weight of the car body to the truck side frames. Such assembly includes a group of load springs positioned between relatively movable upper and lower spring plates and a friction stabilizing mechanism associated with the load springs and functioning to snub or damp the compression and recoil of the load springs.

The invention is concerned more particularly with an assembly of the above type in which a pair of spring supported friction shoes are pressed automatically into frictional engagement with opposed inwardly facing friction surfaces by means of a wedge member inserted for movement between the two shoes. In assemblies of the above character heretofore used or proposed, the wedging pressure exerted by the central wedge against the shoes imposes a load thereon at a location eccentric to the line of force exerted by the supporting springs and, therefore, has a tendency to turn or tilt the shoes in a manner to reduce the area of their outwardly facing friction faces which contact with the said opposed inwardly facing friction surfaces. This tendency of the shoes to tilt causes chattering of the shoes against their associated friction surfaces and also imposes excessive localized wear on the co-engaging friction faces.

It is among the principal objects of the invention to provide, in a stabilized spring group assembly of the above type, friction shoes of improved form cooperating with an improved wedge member in such manner as to overcome the above objections incident to the application of pressure by the central wedge to the shoes at locations eccentric to the line of force exerted by the shoe supporting springs. In this connection, each side of the central wedge is provided with wedging faces which are inclined from the vertical and spaced from each other lengthwise of the wedge which surfaces co-act with similar spaced apart surfaces formed on the friction shoes and thereby form a reactive couple to resist the turning moment set up by the eccentric loading of the friction shoes by the wedge, whereby the shoes are constrained to move in the direction of their length and in firm sliding contact with the co-engaging surfaces with a smooth non-chattering action. The wedging contact of the central wedge with the shoes in the region of their upper and lower edges results in smoother snubbing action and therefore results in a smoother ride for the car body and also enhances the life of the spring stabilizing structure.

Another object of the invention is to provide a stabilized spring group assembly of the character herein shown with readily renewable wear plates for engaging the friction shoes which wear plates are securely held in place without the use of anchoring studs or other form of bolt or clamp device.

In the accompanying drawing, forming a part of this specification, a preferred embodiment of the invention has been shown.

In the drawing:

Fig. 1 is a top plan view of the improved stabilized spring group wherein a portion of the top spring plate has been broken away to more clearly reveal the nature of the invention;

Fig. 2 is a sectional view taken substantially along the line 2—2 of Fig. 1; and Fig. 3 is a sectional view taken substantially along the line 3—3 of Fig. 1.

Referring now to the drawing in detail: The improved spring group assembly involves in its general organization an upper spring plate 10 and a lower spring plate 11. A series of four load springs 12 are interposed between the top and bottom plates and each spring is arranged adjacent a corner of the unit. It will be understood, of course, that the top plate 10 is designed to underlie one end of a railway car bolster 10ᵃ when the assembly is installed in the bolster window 10ᵇ in the usual manner of installation and, accordingly, the upper face of the plate 10 is provided with a series of longitudinal and transverse reinforcing webs 13 and a plurality of lugs 14 extend upwardly from the surface of the plate adapted to fit into corresponding recesses formed in the underneath side of the bolster 10ᵃ to prevent relative shifting movement between the two parts so that the top plate is at all times constrained to follow the movements of the bolster. The top plate 10 and lower spring plate 11 are each provided with marginal retaining flanges 15 to retain the load springs 12 in position between the plates to prevent displacement thereof.

The lower spring plate 11 is in the form of a casting of tray-like configuration from which there extends upwardly in the medial regions thereof a generally rectangular portion providing an open top casing or housing having front and rear transverse walls 17 and side walls 18, the housing being adapted to partially enclose a pair of stabilizer springs 19, the lower ends of which are centered upon lugs 20 integrally formed on the lower spring plate 11. A pair of aligned slots 21 are formed in the front and rear walls 17 medially thereof and receive therethrough a longitudinally extending tie rod or pin 22 having a function in the assembly that will become apparent presently.

As best seen in Figs. 1 and 3, each side wall 18 serves to support on the inner face thereof a wear plate 23, the plate being removably held in position against the wall 18 by means of an outwardly struck protuberance 24 formed substantially centrally of the plate and which extends into a tapered opening 25 formed in the wall 18. Although a single protuberance 24 is shown on each wear plate 23, it is contemplated that a plurality of protuberances may be employed if desired and arranged to seat in additional openings 25. The provision of the protuberances 24 and openings 25 facilitate the assembly and dismantling of the improved spring group and hold the wear plates 23 fixed relative to the housing as a whole so that there can be no transverse, lateral or vertical shifting of said wear plates.

Telescopically received over the upper ends of each adjacent pair of springs at opposite sides of the housing structure are a pair of floating friction shoes 26 which are generally of inverted cup-shape configuration. The shoes 26 are substantially identical in construction and each shoe is formed with a top wall 27 which is supported on the upper ends of the springs 19 and depending walls including inner and outer transversely extending walls 28 and 29 respectively (Fig. 3) and connecting side walls 30. The outer walls 29 present vertical friction faces adapted to bear against the inner faces of the wear plates 23 while the inner walls 28 are each formed with upper and lower inclined surfaces 31 and 32 respectively, the two surfaces 31 being opposed to each other in the assembly and the two surfaces 32 being similarly opposed.

Cooperating with the two pairs of inclined surfaces 31 and 32, is a wedge member 33 which is substantially centrally located in the assembly and having an upper generally triangular head portion 34 and a depending shank portion 35. The head portion 34 is formed with oppositely facing, downwardly converging upper wedge faces 36 which bear against and are complemental to the respective inclined surfaces 31 of the friction shoes 26 while the shank portion 35 of said central wedge is formed with similarly disposed downwardly converging lower faces 37 which bear against and are complemental to the respective inclined surfaces 32 of the shoes 26. From the above description it will be seen that when a downward thrust is applied to the wedge member 33, a load is applied to the shoes 26 at a location eccentric to the line of force exerted by the stabilizing springs 19, 19, but the wedge faces 36, 37 being spaced apart and pressing against correspondingly inclined surfaces 31, 32 of the shoes 26 form a reactive couple to resist the turning moment set up as an incident to eccentric loading of the shoes 26 by the wedge 33. As a consequence of this construction, the shoes are pressed against the wear plates 23 and are therefore constrained to move up and down in a vertical path and with a smooth non-chattering action. This results in a smoother damping of the spring action and therefore produces a smoother ride for the car body and avoids uneven wearing of the relatively movable friction elements. The spaced co-engaging wearing surfaces of the central wedge 33 and the shoes 26 provides a supporting action and uniform distribution of the wedging forces serves to hold all parts of the assembly in proper relation to each other.

Extending transversely through the lower region of the shank portion 35 of the wedge member 33 is a vertically extending slot 40 through which the tie rod 22 extends and in which it is slidable, thus providing a lost motion connection for maintaining the various parts of the package unit in their assembled relationship. Preferably the slot 40 is of such extent that a slight degree of downward tension is applied to the central wedge member 33 so that the stabilizer springs 19 are under slight compression when there is no load upon the central wedge member.

As seen in Figs. 2 and 3, the upper surface or crown portion 41 of the wedge member 33 is arcuate in cross section, the arc representing substantially a true circle fragment. The medial region of the top plate 10 is provided with a complementary crown portion 42, the inner surface of which bears against the upper surface of the crown portion 41 when the parts are assembled in the bolster window 10b.

From the above description it will be seen that since the central wedge member 33 is not attached to the top plate 10 and is free to move relative thereto, oscillatory forward and aft rocking movements as viewed in Fig. 3 of the plate 10 relative to the plate 11, such as are prevalent in railway car operation, will be accompanied by arcuate face-to-face sliding movement of the meeting surfaces 41 and 42 on the top plate and wedge member respectively with practically no forward and aft thrust (Fig. 3) being applied to the wedge member.

Insofar as vertical downward thrusts may be applied to the wedge member 33 by relative vertical movement between the top plate 10 and lower spring plate 11, these thrusts are assimilated by the friction shoes 26 and springs 12 with the shoes receiving the thrust through the two pairs of wedging surfaces 31, 36 and 32, 37 respectively. In such an instance the thrust on the friction shoes is applied both near the top as well as near the bottom regions of the shoes so that this thrust is more evenly distributed and the lateral thrust appplied to the wear plates 23 by the friction shoes is equally distributed over the sliding friction surfaces of these two members instead of being applied at a localized area thereon.

Insofar as any twisting movements of the top plate 10 relative to the bottom spring plate 11 are concerned, the diagonal corners of the crown surface 42 may move out of register with the convex mating crown surface 41 and thereby relieve the wedge 33 and the shoes from the torsional thrusts which would otherwise tend to move the co-engaged wearing faces of the central wedge 33 and the shoes 26 out of co-planar alignment.

The outwardly struck protuberance 24 and cooperating openings 25 provided on the wear plates 23 and side walls 18 of the housing greatly facilitate assembly of the improved structure as well as rendering the removal of the wear plates 23 an easy matter when replacement or repair of any of the parts thereof is necessary. During assembly operations, it is merely necessary to apply the wear plates 23 directly to the inner faces of the side walls 18 and, with the parts thus positioned, the friction shoes 26 and springs 19 may be interposed between the two wear plates so that when the wedge member 33 is placed in position and secured by the tie rod 22, the wear plates 23 will be confined within the structure against dislodgment.

While the invention is shown in one preferred embodiment, it will be obvious from the disclosure that variations in the structure may be made without departing from the spirit of the invention. Therefore, it should be understood that the present invention contemplates all such modifications which come within the scope of the appended claims.

I claim:

1. In a stabilized spring group assembly for insertion in a bolster window of a railway truck side frame to support one end of a truck bolster and including spaced apart relatively movable spring plates, a group of load supporting springs interposed between said plates, housing means on one of said plates defining inwardly facing friction surfaces, a pair of shoes having friction faces arranged parallel to each other and bearing against said inwardly facing surfaces, springs seating against one of said plates and supporting the friction shoes in floating relation with respect to said inwardly facing friction surfaces, and a central wedge member having loose abutting engagement with one of said spring plates and movable relative to the other plate and said shoe members in a position eccentric to the line of force exerted by the latter said springs; the said central wedge being formed on each of two opposed sides with a pair of spaced apart outwardly facing inclined surfaces and each shoe being formed with a pair of inwardly facing spaced apart inclined surfaces cooperating with the adjacent inclined surfaces of said wedge, whereby movement of the wedge in one direction applies lateral pressure to said shoes adjacent their opposite ends to force the entire area of their outwardly facing friction faces into frictional engagement with said inwardly facing friction surfaces of said housing means.

2. In a stabilized spring group assembly as set forth in claim 1 characterized in that said outwardly facing correspondingly inclined surfaces formed on each of two opposed sides of the central wedge are disposed in offset spaced relation lengthwise of the wedge.

3. In a stabilized spring group assembly designed for insertion in a bolster window of a railroad truck side frame to support one end of a truck bolster including spaced apart and relatively movable top and bottom spring plates, load springs interposed between said plates, opposed friction walls extending upwardly from said bottom plate on opposite sides thereof and having inwardly presented vertical friction surfaces which extend to a region adjacent the top plate, a pair of friction shoes confined between said friction walls and each presenting a flat outwardly facing vertical friction face to one of said inwardly facing friction surfaces and substantially coextensive therewith, a stabilizer spring interposed between each friction shoe and said bottom plate to support the friction shoes in floating relation with respect to said inwardly presented friction surfaces, and a central wedge member interposed between said friction shoes in a position to apply thrust thereto eccentric to the line of force exerted by said stabilizing springs and having its upper surface slidably engaging the under-surface of said top spring plate, said central wedge member being formed with an upper generally triangular head portion and a depending shank portion of reduced thickness, said head portion being formed with a pair of oppositely and outwardly presented, downwardly inclined thrust surfaces thereon, said friction shoes each being formed with a complementary inclined thrust surface thereon in the upper regions thereof for cooperative engagement with its complementary inclined thrust surfaces on said wedge member, said shank portion of the wedge member being formed at its lower end with a pair of oppositely and outwardly presented, complementary inclined surfaces thereon, said friction shoes each being formed with a complementary inclined thrust surface thereon in the lower regions thereof for cooperative engagement with its complementary thrust surface on said shank portion of the central wedge member, said cooperating inclined thrust surfaces on said central wedge and friction shoes serving upon downward movement of the top spring plate, and consequently of the central wedge member, to exert lateral pressure on the friction shoes to spread the friction shoes apart and to maintain their outwardly presented friction faces in flat frictional engagement with said inwardly presented vertical friction surfaces.

4. In a stabilized spring group assembly as set forth in claim 3 characterized in that said thrust surfaces on the head portion of said wedge member and on the shank portion thereof are spaced apart in offset relation.

5. In a stabilized spring group assembly as set forth in claim 3 characterized in that said thrust surfaces on the head portion of the wedge member and on the shank portion thereof are disposed in offset relation and spaced from each other lengthwise of the shank portion and have substantially the same inclination with respect to the vertical.

References Cited in the file of this patent

UNITED STATES PATENTS

| | | |
|---|---|---|
| 1,308,099 | O'Connor | July 1, 1919 |
| 1,700,260 | Haseltine | Jan. 29, 1929 |
| 2,116,189 | Clark | May 3, 1938 |
| 2,333,921 | Flesch | Nov. 9, 1943 |
| 2,447,305 | Bachman | Aug. 17, 1948 |
| 2,665,127 | Leese | Jan. 5, 1954 |
| 2,682,397 | Clasen | June 29, 1954 |